(12) United States Patent
Aoyama et al.

(10) Patent No.: US 12,354,809 B2
(45) Date of Patent: Jul. 8, 2025

(54) ELECTROLYTIC CAPACITOR AND METHOD FOR MANUFACTURING SAME

(71) Applicant: Panasonic Intellectual Property Management Co., Ltd., Osaka (JP)

(72) Inventors: Tatsuji Aoyama, Kyoto Fu (JP); Tomoyuki Tashiro, Yamaguchi Ken (JP); Shumpei Matsushita, Yamaguchi Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 31 days.

(21) Appl. No.: 18/546,925

(22) PCT Filed: Feb. 24, 2022

(86) PCT No.: PCT/JP2022/007526
§ 371 (c)(1),
(2) Date: Aug. 17, 2023

(87) PCT Pub. No.: WO2022/181668
PCT Pub. Date: Sep. 1, 2022

(65) Prior Publication Data
US 2024/0312726 A1    Sep. 19, 2024

(30) Foreign Application Priority Data
Feb. 25, 2021  (JP) .................. 2021-029040

(51) Int. Cl.
*H01G 9/008* (2006.01)
*H01G 9/00* (2006.01)
*H01G 9/14* (2006.01)

(52) U.S. Cl.
CPC .......... *H01G 9/008* (2013.01); *H01G 9/0029* (2013.01); *H01G 9/14* (2013.01)

(58) Field of Classification Search
None
See application file for complete search history.

(56) References Cited

U.S. PATENT DOCUMENTS

| | | | | |
|---|---|---|---|---|
| 3,518,500 A | * | 6/1970 | Anderson | ........... H01G 9/00 29/25.03 |
| 3,806,769 A | * | 4/1974 | Derrick | .......... H01G 9/008 361/303 |

(Continued)

FOREIGN PATENT DOCUMENTS

| | | |
|---|---|---|
| JP | H07-106203 A | 4/1995 |
| JP | 2003-243257 A | 8/2003 |

(Continued)

OTHER PUBLICATIONS

International Search Report dated May 17, 2022 issued in International Patent Application No. PCT/JP2022/007526, with English translation.

*Primary Examiner* — Eric W Thomas
(74) *Attorney, Agent, or Firm* — Rimon P.C.

(57) ABSTRACT

An electrolytic capacitor including a plurality of anode bodies and cathode bodies, a plurality of anode tabs connected with the plurality of anode bodies, and an anode lead member connected to the plurality of anode tabs. The plurality of anode tabs include a first anode tab group and a second anode tab group. Each of the first and second anode tab group has a through hole Ha. The anode lead member includes a metal plate-shaped anode connection part, the anode connection part being connected to the first anode tab group and the second anode tab group. Each of the first and second node tab group is connected to the anode connection part using a first fixing structure. The first fixing structure is formed by a portion of the anode connection part extending (Continued)

through the through hole Ha and spreading out to form a crimping structure on the other side.

18 Claims, 6 Drawing Sheets

(56) References Cited

U.S. PATENT DOCUMENTS

| | | | | |
|---|---|---|---|---|
| 3,842,325 | A | * 10/1974 | Callins | H01G 9/008 29/25.03 |
| 2003/0039093 | A1 | 2/2003 | Tadanobu et al. | |
| 2018/0233294 | A1 | 8/2018 | Ishizaki et al. | |

FOREIGN PATENT DOCUMENTS

| | | |
|---|---|---|
| JP | 2005-223197 A | 8/2005 |
| JP | 2009-194263 A | 8/2009 |
| JP | 2010-087290 A | 4/2010 |
| WO | 2017/073032 A1 | 5/2017 |

* cited by examiner

ELECTROLYTIC CAPACITOR AND METHOD FOR MANUFACTURING SAME

CROSS-REFERENCE OF RELATED APPLICATIONS

This application is the U.S. National Phase under 35 U.S.C. § 371 of International Patent Application No. PCT/JP2022/007526, filed on Feb. 24, 2022, which in turn claims the benefit of Japanese Patent Application No. 2021-029040, filed on Feb. 25, 2021, the entire disclosures of which Applications are incorporated by reference herein.

TECHNICAL FIELD

The present disclosure relates to an electrolytic capacitor and a manufacturing method thereof.

BACKGROUND ART

A general stacked electrolytic capacitor is formed by stacking a plurality of anode foils and a plurality of cathode foils together. At this time, it is necessary to connect the plurality of anode foils to each other, and to further connect the anode foils to a lead wire. For example, after connecting the plurality of anode foils by welding or the like, the lead wire is connected to tabs that protrude from the anode foils. A plurality of cathode foils are also connected to a lead wire in the same manner.

PTL 1 (Japanese Laid-Open Patent Publication No. 2010-87290) discloses "a stacked electrolytic capacitor in which through holes are formed in anode foils and separators of a capacitor element including the anode foils and cathode foils that are alternately stacked on each other with the separators interposed therebetween, wherein the cathode foils are bonded to each other at the through hole portions".

CITATION LIST

Patent Literature

PTL 1: Japanese Laid-Open Patent Publication No. 2010-87290

SUMMARY OF INVENTION

Technical Problem

However, the method according to PTL 1 requires a complex method for connecting the cathode foils to each other, and also has the problem of a reduced area of the cathode foils. On the other hand, in some cases, tabs that extend from a plurality of anode foils (or a plurality of cathode foils) are bonded to each other by welding. However, in the case where there are a larger number of tabs, or where the thickness of tabs is large, it may be difficult to reliably bond the tabs to each other by welding. When a plurality of tabs are connected by welding, the contact resistance may be significantly increased. Consequently, the characteristics (e.g., ESR and reliability) of the electrolytic capacitor may be reduced.

Under such circumstances, an object of the present disclosure is to provide an electrolytic capacitor having excellent characteristics, and a manufacturing method thereof.

Solution to Problem

An aspect of the present disclosure relates to an electrolytic capacitor. The electrolytic capacitor includes: a plurality of anode bodies and a plurality of cathode bodies that are stacked together; a plurality of anode tabs each connected with a corresponding one of the plurality of anode bodies, a plurality of cathode tabs each connected with a corresponding one of the plurality of cathode bodies; an anode lead member connected to the plurality of anode tabs; and a cathode lead member connected to the plurality of cathode tabs. The plurality of anode tabs include a first anode tab group including at least one of the anode tabs, and a second anode tab group including at least one of the anode tabs, each of the first anode tab group and the second anode tab group has a through hole HA, the anode lead member includes a plate-shaped anode connection part made of a metal, the anode connection part being stacked together with and connected to the first anode tab group and the second anode tab group, each of the first anode tab group and the second anode tab group is fixed and connected to the anode connection part using at least one first fixing structure, and the first fixing structure is formed by a portion of the anode connection part extending through the through hole HA and forming a crimping structure.

Another aspect of the present disclosure relates to a manufacturing method of an electrolytic capacitor. The manufacturing method is a manufacturing method of an electrolytic capacitor including: a plurality of anode bodies and a plurality of cathode bodies that are stacked together; a plurality of anode tabs each connected with a corresponding one of the plurality of anode bodies, a plurality of cathode tabs each connected with a corresponding one of the plurality of cathode bodies; an anode lead member connected to the plurality of anode tabs; and a cathode lead member connected to the plurality of cathode tabs. The plurality of anode tabs include a first anode tab group including at least one of the anode tabs, and a second anode tab group including at least one of the anode tabs. The manufacturing method includes, in the following order: step (i) of stacking the plurality of anode bodies and the plurality of cathode bodies together; and step (ii) of stacking each of the first anode tab group and the second anode tab group on a plate-shaped anode connection part of the anode lead member, the anode connection part being made of a metal, and fixing and connecting the first anode tab group and the second anode tab group to the anode connection part using a first fixing structure, and the step (ii) includes: step (ii-a) of stacking the first anode tab group on the anode connection part; step (ii-b) of stacking the second anode tab group on the anode connection part; step (ii-c) of deforming, using a first needle-shaped member, a first portion of the anode connection part so as to penetrate the first anode tab group to form a first protrusion; step (ii-d) of deforming, using a second needle-shaped member, a second portion of the anode connection part so as to penetrate the second anode tab group to form a second protrusion; and step (ii-e) of deforming the first protrusion and the second protrusion so as to form a crimping structure to form the first fixing structure.

Advantageous Effects of Invention

According to the present disclosure, it is possible to obtain an electrolytic capacitor having excellent characteristics.

While the novel features of the invention are set forth in the appended claims, the invention, both as to organization and content, will be better understood and appreciated, along

DESCRIPTION OF EMBODIMENTS

Figure 1A:
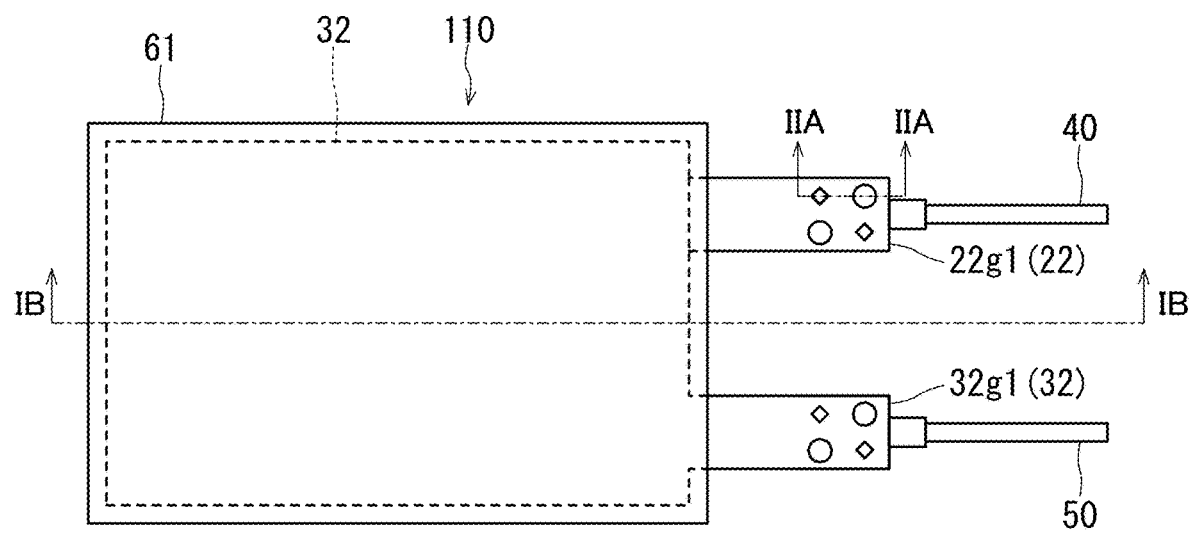
FIG. 1A is a top view schematically showing an example of a step of a manufacturing method according to Embodiment 1.

In the following, embodiments of the present disclosure will be described by way of examples. However, the present disclosure is not limited to the examples described below. Although examples of specific numerical values and materials may be given in the following description, other numerical values and materials may be used as long as the effects of the present disclosure can be achieved. In the present specification, the expression "from a numerical value A to a numerical value B" includes the numerical value A and the numerical value B, and can be read as "a numerical value A or more and a numerical value B or less".

(Electrolytic Capacitor)

The electrolytic capacitor according to the present embodiment includes: a plurality of anode bodies and a plurality of cathode bodies that are stacked together; a plurality of anode tabs each connected with a corresponding one of the plurality of anode bodies, a plurality of cathode tabs each connected with a corresponding one of the plurality of cathode bodies; an anode lead member connected to the plurality of anode tabs; and a cathode lead member connected to the plurality of cathode tabs. The plurality of anode tabs include a first anode tab group including at least one of the anode tabs, and a second anode tab group including at least one of the anode tabs. Each of the first anode tab group and the second anode tab group has a through hole HA. The anode lead member includes a plate-shaped anode connection part made of a metal, the anode connection part being stacked together with and connected to the first anode tab group and the second anode tab group. Each of the first anode tab group and the second anode tab group is fixed and connected to the anode connection part using at least one first fixing structure. The first fixing structure is formed by a portion of the anode connection part extending through the through hole HA and forming a crimping structure. The aforementioned portion of the anode connection part may be hereinafter referred to as a "portion (P)".

For example, the plurality of anode bodies and the plurality of cathode bodies are stacked together such that the anode bodies and the cathode bodies are alternately arranged one by one. Usually, a surface of each anode body is roughened (or porosified, from another perspective). A dielectric layer is formed on at least a portion of the surface (e.g., the roughened surface) of each anode body. In other words, usually, each anode body includes a core part, and a porous part disposed on a surface of the core part, and a dielectric layer is formed on the surface of the porous part.

The number of anode bodies may be the same as, or different from the number of cathode bodies. For example, the number of anode bodies may be the number of cathode bodies plus 1, or may be the number of cathode bodies minus 1. In a preferred example, the number of anode bodies is the number of cathode bodies minus 1.

An electrolyte is disposed between an anode body and a cathode body (more specifically, between a dielectric layer formed on an anode body and a cathode body). A separator may be disposed between an anode body and a cathode body if necessary. That is, if necessary, an electrolyte and a separator may be disposed between an anode body and a cathode body.

As the anode bodies, it is possible to use a metal foil that can be used as an anode body of an electrolytic capacitor. For example, a foil made of a valve metal (e.g., aluminum) may be used. The dielectric layer formed on the surface of each anode body may be formed by oxidizing the surface of the anode body. As the cathode bodies, it is possible to use a metal foil that can be used as a cathode body of an electrolytic capacitor. For example, a foil made of a valve metal (e.g., aluminum) may be used. Note that a metal foil (e.g., an aluminum foil) having a layer made of titanium, nickel, carbon, or the like formed on a surface thereof may be used as an anode body.

Usually, one anode tab is connected with one anode body. The anode tab and the anode body may be members separate from each other. However, usually, the anode body and the anode tab are formed by a single sheet of metal foil. Similarly, one cathode tab is connected with one cathode body. The cathode tab and the cathode body may be members separate from each other. However, usually, the cathode body and the cathode tab are formed by a single sheet of metal foil.

The lead members (the anode lead member and the cathode lead member) are made of a metal. Examples of the metal constituting these members include aluminum, copper, tin, iron, and alloys thereof. Each lead member may be made of a plurality of types of metals. Usually, the anode lead member and the cathode lead member have the same configuration, but may have different configurations.

The anode lead member includes a plate-shaped anode connection part made of a metal. The anode connection part can be formed, for example, by pressing a rod-shaped member made of a metal. In that case, the anode lead member may include a plate-shaped anode connection part, a rod-shaped part extending continuously with the anode connection part, and a linear lead part extending continuously with the rod-shaped part. The cathode lead member may have the same configuration.

The thicknesses of the electrode assembly (the anode bodies and the cathode bodies) and the tabs (the anode tabs and the cathode tabs) are not particularly limited, and may be in the range of 20 μm to 200 μm (e.g., the range of 50 μm to 150 μm). When the thickness of the tabs is large, it is difficult to connect the plurality of tabs reliably and with a low contact resistance using a conventional method such as welding. Therefore, the manufacturing method according to the present disclosure is especially effective when the thickness of the tabs is large. When the thickness of the tabs (and the electrode assembly) is 100 μm or more, the manufacturing method according to the present disclosure can be particularly preferably used.

The plurality of anode tabs include a first anode tab group including at least one anode tab, and a second anode tab group including at least one anode tab. Typically, the plurality of anode tabs can be divided into a first anode tab group and a second anode tab group, and each of the first and second tab groups includes a plurality of anode tabs. Each of the first anode tab group and the second anode tab group has at least one through hole HA. The number of through holes HA present in one tab group is preferably 2 or more, and may be in the range of 2 to 6, for example. Note that the through holes HA are through holes in which the first fixing structure is formed, and do not include through holes in which no first fixing structures are formed (i.e., through holes through which the portion (P) of the anode connection part does not pass). Through holes (e.g., through holes Hp in FIG. 2E described below) in which no first fixing structures are formed may be formed in one tab group.

The maximum diameter of each through hole HA (the diameter of a portion of the through hole HA that has the largest diameter) may be in the range of 0.2 mm to 1.0 mm (e.g., 0.3 mm to 0.8 mm). The size (planar size) of the portion (P) of the anode connection part that is deformed so as to pass through the through hole HA is usually the same as, or slightly smaller than the aforementioned maximum diameter.

The planar shape of the through hole HA may be circular or polygonal. From the viewpoint of ease of stably forming the first fixing structure (crimping structure), it is preferable that the planar shape of the through hole HA is polygonal, and particularly preferably quadrangular (e.g., square or rhombic). When the planar shape of the through hole HA is polygonal, the maximum diameter of the polygonal shape is the diameter of the planar shape portion.

The anode lead member includes a plate-shaped anode connection part that is stacked together with and connected to the first anode tab group and the second anode tab group. The anode connection part is made of a metal, and is preferably made of a highly malleable metal (e.g., aluminum). By fixing the anode tab group and the plate-shaped portion to each other while they are in contact with each other, the anode lead member and the anode bodies are connected to each other.

The first anode tab group and the second anode tab group are fixed to the anode connection part using the first fixing structure. The first fixing structure is formed by the portion (P) of the anode connection part extending from one side to the other side of at least one through hole HA and spreading outward on the other side. The formation of the first fixing structure will be described later.

In the electrolytic capacitor according to the present embodiment, the plurality of anode tabs and the anode lead member are fixed to each other using the first fixing structure (crimping structure), and the anode tabs and the anode lead member are electrically connected to each other. Accordingly, even when the number of tabs or the thickness of the tabs is large, it is possible to realize a connection with a higher degree of reliability and a lower contact resistance as compared with a connection realized by welding. Note that the plurality of anode tabs and the anode lead member are electrically connected to each other also at portions thereof that are in contact with each other on principal surfaces thereof. That is, it is not just the portion of the first fixing structure where these components are electrically connected to each other.

The first anode tab group and the second anode tab group may be arranged so as to sandwich the anode connection part therebetween. Such an arrangement allows the first fixing structures to be formed on both sides of the anode connection part, thus making it possible to realize a more favorable connection. Note that the first anode tab group and the second anode tab group may be fixed to one side of the anode connection part. In either case, the first anode tab group and the second anode tab group may be arranged so as to overlap each other when viewed from above, or may be arranged so as not to overlap each other when viewed from above.

A through hole Hp may be formed in a portion of each of the first and second anode tab groups, the portion opposing the first fixing structure (or the through hole HA) via the anode connection part interposed therebetween. The through hole Hp will be described in relation to a manufacturing method and Embodiment 1, which will be described later.

The first anode tab group may include two or more anode tabs, and the second anode tab group may include two or more anode tabs. It is preferable that the numbers of the anode tabs respectively included in the anode tab groups are set to be about the same. For example, when the total number of the anode tabs is an even number, the first anode tab group and the second anode tab group may include the same number of anode tabs. Usually, one anode tab is connected with one anode body. Therefore, the total number of anode tabs is usually equal to the total number of anode bodies.

The diameter of the through hole HA may decrease in a direction away from the anode connection part. This configuration facilitates formation of the first fixing structure, thus making it possible to realize a more favorable connection. Note that the "decreasing in a direction away from the anode connection part" includes continuous decreasing and stepwise decreasing.

Each of the first anode tab group and the second anode tab group may be fixed and connected to the anode connection part using two or more first fixing structures.

A dielectric layer may be formed on a surface of each of the plurality of anode tabs. When an anode body and an anode tab are integral with each other, the anode tab also has the same structure as the anode body. Since a dielectric layer is usually formed on the surface of each of the anode bodies, a dielectric layer is also formed on a surface of the anode tab that is formed integrally with the anode body. For example, each of the anode tabs may include a core part and a porous part, and a dielectric layer may be formed on a surface of the porous part. In this case, it is preferable that the core part and the portion (P) of the anode connection part are in contact with each other in the through hole Ha in which the first fixing structure is formed. When a dielectric layer is present between the metal (metal foil) constituting the anode tab and the portion (P) of the anode connection part, the resistance in that portion is increased. Accordingly, it is preferable that the metal (e.g., the core part) of the metal foil constituting the anode tab and the portion (P) of the anode connection part are in direct contact with each other on a side surface of the through hole HA.

A portion of the plurality of anode tabs that overlaps the anode connection part may have a smaller thickness than the anode bodies. With this configuration, it is possible to realize a highly reliable connection even when the initial thickness of the anode tabs is large, or when there are a large number of anode tabs to be connected. This configuration can be realized, for example, by pressing the anode tab groups.

It is preferable that the connection between the cathode tabs and the cathode lead member is also established using the same structure as that used for the connection between the anode tabs and the anode lead member. In that case, in the above description, the anode lead member can be replaced by the cathode lead member, the anode connection part can be replaced by the cathode connection part, the anode tabs can be replaced by the cathode tabs, the anode tab groups can be replaced by the cathode tab groups, and the through holes HA can be replaced by through holes HC. For example, the electrolytic capacitor according to the present embodiment may include the following configuration (1).

(1) The plurality of cathode tabs include a first cathode tab group including at least one of the cathode tabs, and a second cathode tab group including at least one of the cathode tabs. Each of the first cathode tab group and the second cathode tab group includes a through hole HC. The cathode lead member includes a plate-shaped cathode connection part made of a metal, the cathode connection part being stacked together with and connected to the first cathode tab group and the second cathode tab group. Each of the first cathode tab group and the second cathode tab group is fixed and connected to the cathode connection part using at least one second fixing structure. The second fixing structure is formed by a portion of the cathode connection part extending through the through hole HC and forming a crimping structure.

The above-described effects can be achieved by connecting the cathode tabs and the cathode lead member to each other using the same fixing structure (crimping structure) as that used for the connection between the anode tabs and the anode lead member. It is preferable that the connection between the anode tabs and the anode lead member, and the connection between the cathode tabs and the cathode lead member are both established using the above-described fixing structure.

(Constituent Elements of Electrolytic Capacitor)

Examples of constituent elements of the electrolytic capacitor will be described below. However, the constituent elements of the electrolytic capacitor according to the present disclosure are not limited to the following examples. The electrolytic capacitor may include constituent elements other than the constituent elements described below if necessary.

(Capacitor Element)

The capacitor element includes at least one anode body including a dielectric layer formed on a surface thereof, at least one cathode body, and an electrolyte (and a separator if necessary) disposed therebetween. When the capacitor element includes a separator, the separator may be impregnated with at least a portion of the electrolyte. The capacitor element is protected by an outer package. The outer package includes a resin composition and/or a case. The anode body, the cathode body, and the lead members have been described above, and therefore redundant descriptions thereof will be omitted.

(Separator)

As the separator, it is possible to use, for example, a non-woven fabric or porous film made of an insulating material. For example, a non-woven fabric including fibers of cellulose, polyethylene terephthalate, vinylon, polyamide (e.g., aliphatic polyamide, aromatic polyamide such as aramid) may be used as the separator. The separator may be in the form of a sheet. Alternatively, the separator may be in the form of a bag, and the anode body or the cathode body may be accommodated thereinside.

(Electrolyte)

Examples of the electrolyte include an electrolytic solution, a solid electrolyte, and a mixture of a solid electrolyte and an electrolytic solution. That is, the electrolyte may be composed only of an electrolytic solution, may be composed only of a solid electrolyte, or may be composed of a solid electrolyte and an electrolytic solution.

Examples of the electrolytic solution include a non-aqueous solvent containing a solute such as an organic salt dissolved therein. The non-aqueous solvent may be an organic solvent or an ionic liquid. Examples of the non-aqueous solvent include ethylene glycol, propylene glycol, sulfolane, γ-butyrolactone, and N-methylacetamide. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate. As long as the effects of the present invention can be achieved, a liquid component (e.g., a non-aqueous solvent used for an electrolytic solution) may be used in place of the electrolytic solution. For example, the electrolytic capacitor according to the present embodiment may include a plurality of anode bodies and a plurality of cathode bodies that are stacked together, and separators and a liquid component disposed between the anode bodies and the cathode bodies.

Examples of the solid electrolyte include a manganese compound and a conductive polymer. Examples of the conductive polymer include polypyrrole, polythiophene, polyaniline, and derivatives thereof. The solid electrolyte (solid electrolyte layer) containing a conductive polymer may be formed by subjecting a raw material monomer to chemical polymerization and/or electrolysis polymerization on the dielectric layer. Alternatively, the solid electrolyte may be disposed by applying a liquid containing a conductive polymer to the dielectric layer. A dopant (e.g., a polymer dopant) may be added to the conductive polymer.

In the following, examples of the electrolytic capacitor according to the present disclosure will be described in detail with reference to the drawings. The above-described configurations can be applied to the examples described below. The examples described below can be changed based on the above descriptions. The matters described below may be applied to the above-described embodiment. In the embodiments described below, constituent elements that are not essential to the electrolytic capacitor according to the present disclosure may be omitted.

(Manufacturing Method of Electrolytic Capacitor)

A manufacturing method according to the present embodiment is a manufacturing method of an electrolytic capacitor. With this manufacturing method, the electrolytic capacitor according to the present embodiment can be manufactured. Accordingly, the matters described in relation to the electrolytic capacitor according to the present embodiment can be applied to the following manufacturing method. Matters that will be described for the following manufacturing method may be applied to the electrolytic capacitor described above. The electrolytic capacitor according to the present embodiment may be manufactured using a method other than the method described below.

The manufacturing method according to the present embodiment is a manufacturing method of an electrolytic capacitor including: a plurality of anode bodies and a plurality of cathode bodies that are stacked together; a plurality of anode tabs each connected with a corresponding one of the plurality of anode bodies, a plurality of cathode tabs each connected with a corresponding one of the plurality of cathode bodies; an anode lead member connected to the plurality of anode tabs; and a cathode lead member connected to the plurality of cathode tabs. The plurality of anode tabs include a first anode tab group including at least one of the anode tabs, and a second anode tab group including at least one of the anode tabs. These constituent elements have been described above, and therefore redundant descriptions thereof will be omitted. The manufacturing method according to the present embodiment includes the following step (i) and step (ii) in this order.

(Step (i))

The step (i) is a step of stacking the plurality of anode bodies and the plurality of cathode bodies together. For example, the plurality of anode bodies and the plurality of cathode bodies are stacked together such that the anode bodies and the cathode bodies are alternately arranged one by one. If necessary, separators may be disposed between the anode bodies and the cathode bodies.

The first anode tab group may include two or more of the anode tabs, and the second anode tab group may include two or more of the anode tabs. When the anode tab group includes a plurality of anode tabs, through holes (through holes Ha, Hp) described below may be formed in a state in which the plurality of anode tabs are bundled together. Alternatively, the through hole Ha and the through hole Hp may be formed by stacking together a plurality of anode tabs in which through holes (through holes ha, hp) have been formed.

(Step (ii))

The step (ii) is a step of stacking each of the first anode tab group and the second anode tab group on a plate-shaped anode connection part of the anode lead member, the anode connection part being made of a metal, and fixing and connecting the first anode tab group and the second anode tab group to the anode connection part using a first fixing structure. The step (ii) includes step (li-a), step (ii-b), step (li-c), step (ii-d), and step (li-e).

The step (li-a) is a step of stacking the first anode tab group on the anode connection part, and the step (li-b) is a step of stacking the second anode tab group on the anode connection part.

Usually, the step (li-c) and the step (ii-d) are performed after performing the step (li-a) and the step (ii-b), and thereafter the step (ii-e) is performed. In that case, in the step (ii-a) and the step (li-b), the first anode tab group and the second anode tab group may be stacked together with the anode connection part so as to sandwich the anode connection part therebetween. Doing so makes it possible to reduce the number of anode tabs to be fixed using one first fixing structure. By forming the first fixing structures on both sides of the anode connection part, it is possible to realize a more stable connection. Alternatively, all of the anode tab groups may be disposed on one side of the anode connection part. In either case, the first anode tab group and the second anode tab group may be arranged so as to overlap each other when viewed from above, or may be arranged so as not to overlap each other when viewed from above.

The step (li-c) is a step of deforming, using a first needle-shaped member, a first portion (P) of the anode connection part so as to penetrate the first anode tab group to form a first protrusion. The step (ii-d) is a step of deforming, using a second needle-shaped member, a second portion (P) of the anode connection part so as to penetrate the second anode tab group to form a second protrusion.

The step (ii-e) is a step of deforming each of the first protrusion and the second protrusion so as to form a crimping structure to form the first fixing structure. The step (ii-e) may be performed, for example, by pressing each of the first protrusion and the second protrusion such that the anode tab group and the anode connection part that are stacked together are held at least at portions in the vicinity of the first and second protrusions. Through the above-described steps, first fixing structures (crimping structures) are formed.

The manufacturing method according to the present embodiment may further include step (X) of pre-forming a through hole Hp in a portion of the second anode tab group through which the first needle-shaped member passes in the step (ii-c), and a portion of the first anode tab group through which the second needle-shaped member passes in the step (ii-d). Usually, the step (X) is performed before the step (ii). For example, the step (X) may include a step of forming through holes hp in the plurality of anode tabs such that the through hole Hp is formed. The plurality of anode tabs in which the through holes hp have been formed are stacked to form the anode tab group, whereby the through hole Hp is formed at predetermined location.

The manufacturing method according to the present embodiment may further include step (Y) of pre-forming a through hole Ha in a portion of the first anode tab group through which the first needle-shaped member passes in the step (ii-c), and a portion of the second anode tab group through which the second needle-shaped member passes in the step (ii-d). Usually, the step (Y) is performed before the step (ii). For example, the step (Y) may include a step of forming through holes ha in the plurality of anode tabs such that the through holes HA are formed. The plurality of anode tabs in which the through holes ha have been formed are stacked to form the anode tab groups, whereby the through hole Ha is formed in predetermined locations. The through hole Ha serves as the through hole HA in the electrolytic capacitor. Therefore, the matters (e.g., the size and the shape) described for the through hole HA can be applied to the through hole Ha.

The through hole Hp and the through hole Ha can be formed by performing the step (ii-c) and the step (ii-d) without pre-forming these through holes. However, by pre-forming the through holes, it is possible to suppress an increase in the contact resistance caused by the dielectric layers present in the through hole portions.

In the step (Y), the through hole Ha may be formed so as to have a tapered shape. Also, in the steps (ii-a) and (ii-b), the first anode tab group and the second anode tab group may be stacked on the anode connection part such that the through hole Ha has a diameter that decreases in a direction away from the anode connection part.

When the diameter of the through hole Ha is decreased in a direction away from the anode connection part, the diameter of the through hole ha to be formed in an anode tab may be decreased with an increase in the distance from the anode connection part to the position of the anode tab. The anode tabs in which such through holes ha have been formed are stacked such that the respective central axes of the through holes ha substantially coincide with each other. With this configuration, the diameter of the through hole Ha decreases stepwise in a direction away from the anode connection part. Alternatively, the through hole Ha having a tapered shape may be formed in a state in which the plurality of anode tabs are bundled into the corresponding anode tab groups.

When no through holes Ha are pre-formed in the first anode tab group, the portion (P) of the anode connection part and the portion of the first anode tab group that the needle-shaped member has penetrated in the step (ii-c) constitute a through hole HA. Similarly, when no through holes Ha are pre-formed in the second anode tab group, the portion (P) of the anode connection part and the portion of the second anode tab group that the needle-shaped member has penetrated in the step (ii-d) constitute a through hole HA. When a through hole Ha is pre-formed, the through hole Ha constitutes a through hole HA. That is, the through holes HA in the electrolytic capacitor include two types of through holes, namely, through holes resulting from perforation using the needle-shaped member, and through holes that have been changed from the pre-formed through holes Ha.

The first fixing structure formed in the first anode tab group and the first fixing structure formed in the second anode tab group may have different shapes, but usually have the same shape. The first needle-shaped member and the second needle-shaped member may be different, but usually are the same needle-shaped member. As the needle-shaped members, any needle-shaped member capable of deforming the portion (P) so as to form a protrusion may be used, and it is possible to use, for example, a needle made of an inorganic substance (e.g., metal) that is harder than the anode bodies.

The shape of a tip portion of the needle-shaped members (the shape of a portion that enters the through hole Ha) may be smaller than the shape of the through hole Ha, or may be equal to or larger than the shape of the through hole Ha, in a state in which the needle-shaped members are inserted to the maximum extent into the through hole Ha in the step (ii-c) and the step (ii-d). The shape of the tip portion of the needle-shaped members may be selected according to the shape of the through hole Ha. For example, when the planar shape of the through hole Ha is quadrangular, the shape of the tip portion of the needle-shaped members is preferably quadrangular pyramidal.

In the step (ii), each of the first anode tab group and the second anode tab group may be fixed and connected to the anode connection part using a plurality of first fixing structures.

Note that in the middle of the step (ii) or after the step (ii), a step for reinforcing the first fixing structure may be performed. Examples of such a step include laser welding and cold welding. Of course, such steps need not necessarily be performed Through the above-described steps, the anode tab group and the anode connection part are connected to each other, and as a result, the anode bodies and the anode lead member are electrically connected to each other. Thereafter, using the resultant stack (stack of the anode bodies, the cathode bodies, and the separators), an electrolytic capacitor may be manufactured using a known method. For example, an electrolyte may be disposed between the anode bodies and the cathode bodies to form a capacitor element, and thereafter the capacitor element may be sealed with an outer package. At this time, the electrolyte may be disposed between the anode bodies and the cathode bodies by immersing the stack of the anode bodies and the cathode bodies (and the separators if necessary) in a dispersion of a solid electrolyte and/or an electrolytic solution. The solid electrolyte may be synthesized by electrolysis polymerization or the like on the dielectric layers on the surfaces of the anode bodies. The solid electrolyte may be formed on the dielectric layers on the surfaces of the anode bodies before stacking the anode bodies and the cathode bodies together. Each of these procedures may be performed using a known method.

As described above, the cathode tabs and the cathode lead member may be connected to each other using the same method as that used for the connection between the anode tabs and the anode lead member. In that case, in the above description, the anode lead member can be replaced by the cathode lead member, the anode connection part can be replaced by the cathode connection part, the anode tabs can be replaced by the cathode tabs, the anode tab groups can be replaced by the cathode tab groups, and the through holes Ha can be replaced by the through holes Hc. For example, the manufacturing method according to the present embodiment may have the following configuration (2).

(2) The plurality of cathode tabs include a first cathode tab group including at least one of the cathode tabs, and a second cathode tab group including at least one of the cathode tabs. The step (ii) further includes step (II) of stacking each of the first cathode tab group and the second cathode tab group on a plate-shaped cathode connection part of the cathode lead member, the cathode connection part being made of a metal, and fixing and connecting the first cathode tab group and the second cathode tab group to the cathode connection part using a second fixing structure. The step (II) includes: step (II-a) of stacking the first cathode tab group on the cathode connection part; step (II-b) of stacking the second cathode tab group on the cathode connection part; step (II-c) of deforming, using a third needle-shaped member, a first portion of the cathode connection part so as to penetrate the first cathode tab group to form a third protrusion; step (II-d) of deforming, using a fourth needle-shaped member, a second portion of the cathode connection part so as to penetrate the second cathode tab group to form a fourth protrusion; and step (II-e) of deforming each of the third protrusion and the fourth protrusion so as to spread outward to form the second fixing structure.

The above-described effects can be achieved by connecting the cathode tabs and the cathode lead member to each other using the same structure as that used for the connection between the anode tabs and the anode lead member. The matters described for the connection between the anode tab group and the anode connection member can also be applied to the method of connecting the cathode tab group and the cathode connection member, and therefore redundant descriptions thereof will be omitted. The step (II-a) to the step (II-e) correspond to the step (ii-a) to the step (ii-e), respectively.

In the following, exemplary embodiments of the present disclosure will be described in detail with reference to the drawings. However, the present disclosure is not limited to the following embodiments. The embodiments described below can be changed based on the above descriptions. The matters described below may be applied to the above-described embodiment. Note that the drawings described below are schematic diagrams, and the scale of the elements shown is significantly different from that of the actual elements. The scale of the elements may be changed from drawing to drawing.

Embodiment 1

Embodiment 1 describes an example of the manufacturing method according to the present embodiment, and an example of an electrolytic capacitor according to the present embodiment that is manufactured using the manufacturing method.

First, a plurality of anode bodies 21, a plurality of cathode bodies 31, and separators 61 are stacked together (step (i)). At this time, at least one through hole Ha is formed in a first anode tab group 22g1 including two anode tabs 22, and in a second anode tab group 22g2 including two anode tabs 22. Similarly, at least one through hole Hc is formed in a first cathode tab group 32g1 including two cathode tabs 32 and in a second cathode tab group including two cathode tabs 32. Then, the first anode tab group 22g1 and the second anode tab group 22g2 are stacked on the anode connection part 41 (steps (ii-a) and (ii-b)). Similarly, the first cathode tab group 32g1 and the second cathode tab group are stacked on the cathode connection part. The anode connection part 41 is a member located at an end portion of the anode lead member 40. The cathode connection part is a member located at an end portion of the cathode lead member 50.

Figure 1B:
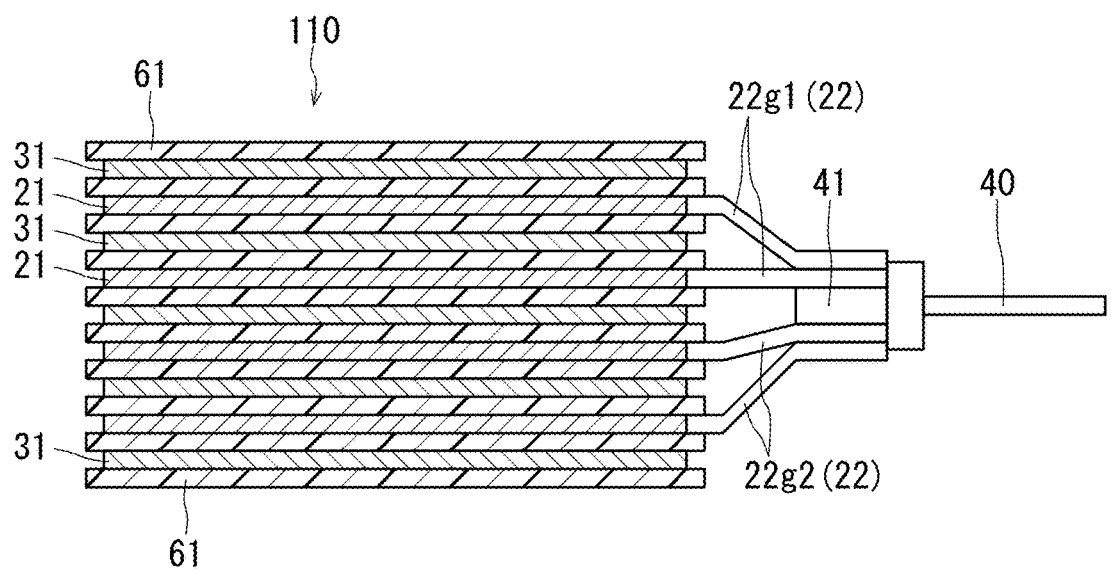
FIG. 1B is a cross-sectional view taken along the line IB-IB in FIG. 1A.
Figure 2A:
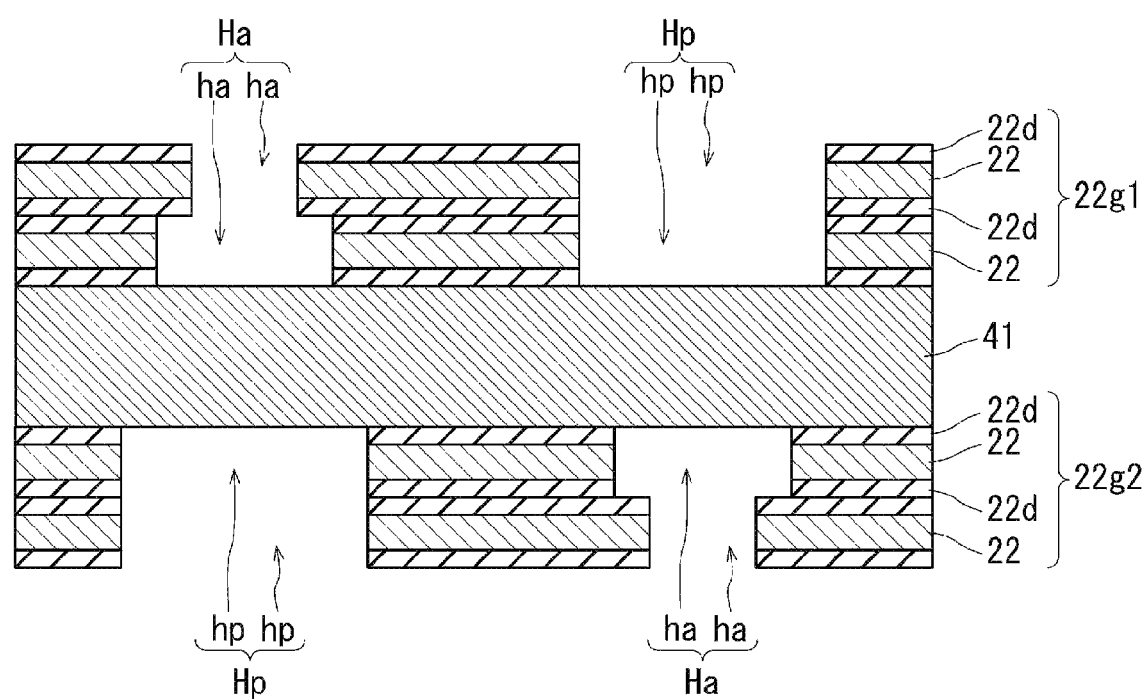
FIG. 2A is a cross-sectional view taken along the line IIA-IIA in FIG. 1A.

FIG. 1A is a top view schematically showing the state of a stack 110 after the above-described steps have been performed. FIG. 1B is a cross-sectional view taken along the line IB-IB in FIG. 1A. FIG. 2A is across-sectional view taken along the line IIA-IIA in FIG. 1A.

Embodiment 1 describes an example in which through holes Ha having a square planar shape, and through holes Hp having a circular planar shape are pre-formed. As shown in FIG. 2A, the through holes Ha each have a tapered shape that is tapered away from the anode connection part 41. Each of the through holes Ha having a tapered shape is formed by stacking the plurality of anode tabs 22 having through holes ha with different shapes. A through hole Hp is constituted by through holes hp that are respectively formed in the plurality of anode tabs 22. Note that the through hole Ha may have a shape that is not a tapered shape (i.e., a shape having a constant diameter). The manufacturing method according to the present embodiment can be performed without forming one or both of the through hole Ha and the through hole Hp. For example, only the through hole Ha may be formed, only the through hole Hp may be formed, or the through holes Ha and Hp need not be formed.

As shown in the drawings, the first anode tab group 22g1 and the second anode tab group 22g2 are arranged so as to precisely overlap each other when viewed from above. However, they may be arranged such that at least portions thereof do not overlap each other, or may be arranged so as not to overlap each other at all. The same applies to the cathode tab groups. Note that the cathode tab groups (the first cathode tab group 32g1 and the cathode tab group) are connected to the lead member using the same method as that used for the anode tab groups 22g (the first anode tab group 22g1 and the second anode tab group 22g2). Therefore, in the following, the connection of the anode tab groups 22g will be mainly described, and the description of the connection of the cathode tab groups 32g will be omitted.

The plurality of anode bodies 21 and the plurality of cathode bodies 31 are stacked together with the separators 61 sandwiched therebetween to form the stack 110. Each of the anode bodies 21 includes a core part (not shown) and a porous part (not shown) present on the core part, and a dielectric layer (not shown) is formed on a surface of the porous part (surface of the anode body 21). Note that at least one of the separators 61 present on the outermost side of the stack 110 may be omitted.

FIG. 2A shows an enlarged view of a portion of the anode tab groups 22g. FIG. 2A is a cross-sectional view taken along the line IIA-IIA in FIG. 1A. Each anode body 21 and the corresponding anode tab 22 are formed using a single sheet of metal foil, and have the same structure. That is, as in the case of the anode bodies 21, each of the anode tabs 22 includes a core part and a porous part (not shown) formed on a surface of the core part, and a dielectric layer 22d is formed on a surface of the porous part. An end face of the anode tab 22 is exposed on a side surface of the through hole Ha. Note that the dielectric layer 22d can also be considered as a part of the anode tab 22.

At a position located on a side opposite to each through hole Ha across the anode connection part 41, a through hole Hp is formed in an anode tab group 22g located on that opposite side. The through hole Hp is a hole through which the needle-shaped member is passed in a later step. Preferably, the through hole Hp has such a size that the through hole Hp will not be widened by the needle-shaped member passing through that portion. The method according to the present disclosure can also be performed without forming any through holes Hp. However, by forming a through hole Hp, it is possible to prevent the dielectric layer 22d on the surface of the anode tab 22 located at that portion from being engulfed in the first fixing structure. Consequently, it is possible to reduce the contact resistance in the first fixing structure.

Figure 2B:
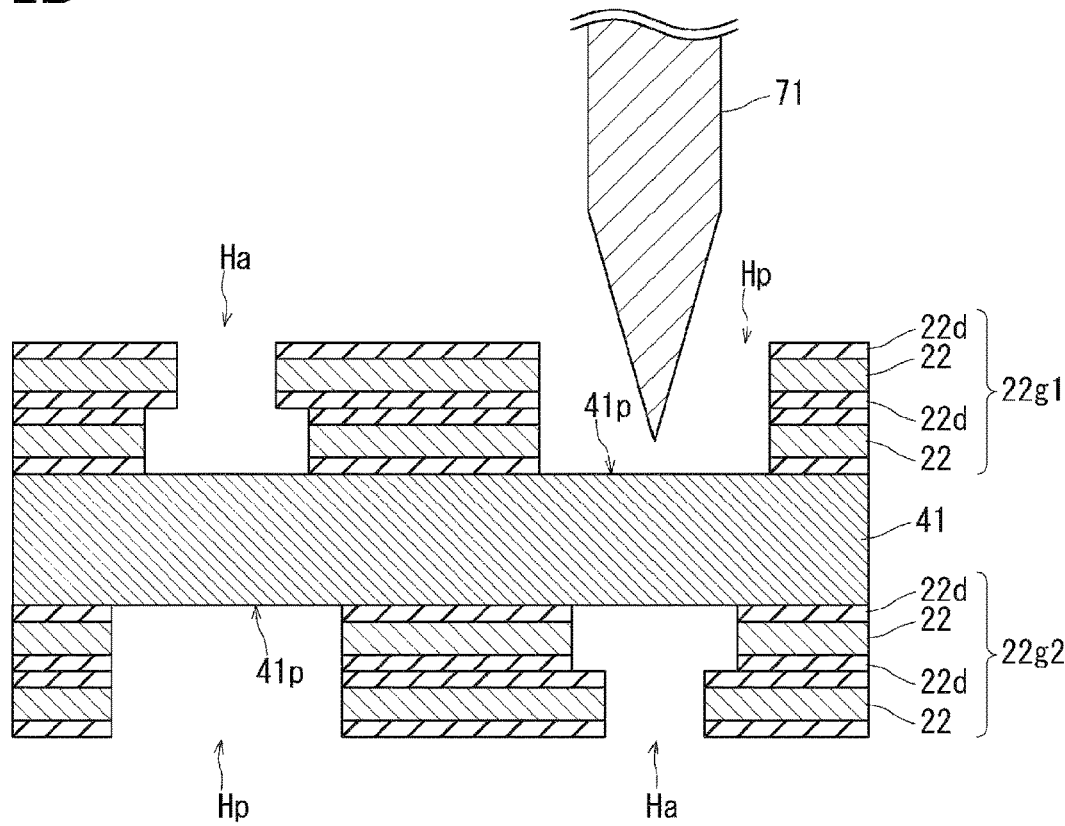
FIG. 2B is a cross-sectional view schematically showing an example of a step subsequent to FIG. 2A.
Figure 2C:
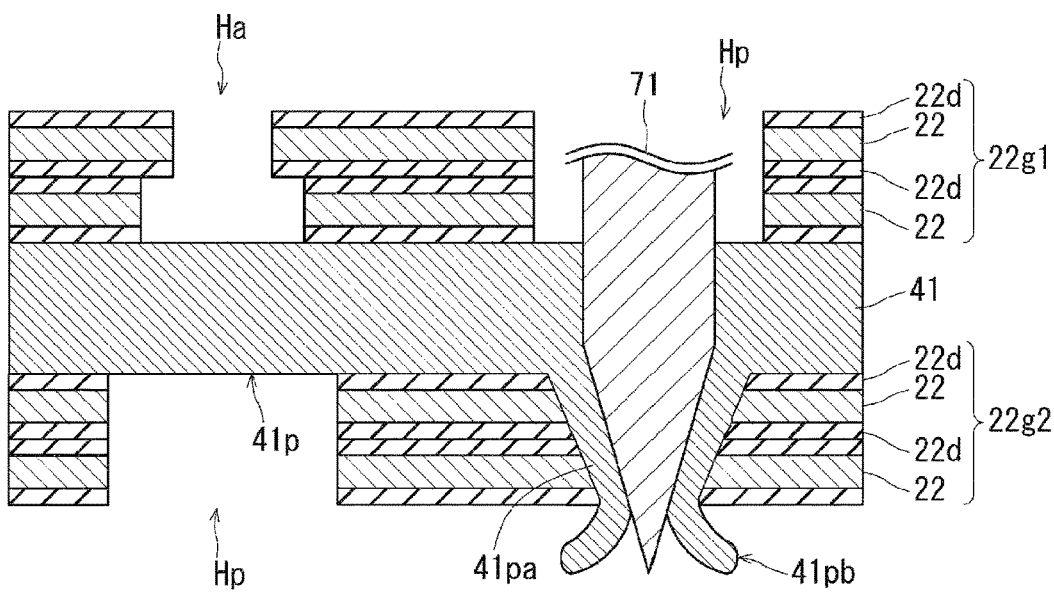
FIG. 2C is a cross-sectional view schematically showing an example of a step subsequent to FIG. 2B.

Next, the step (ii-c) of deforming, using a needle-shaped member 71 (first needle-shaped member), a portion 41p (first portion) of the anode connection part 41 so as to penetrate the first anode tab group 22g1 to form a protrusion 41pb (first protrusion), and the step (ii-d) of deforming, using a needle-shaped member 71 (second needle-shaped member), a portion 41p (second portion) of the anode connection part 41 so as to penetrate the second anode tab group 22g2 to form a protrusion 41pb (second protrusion). Specifically, first, as shown in FIGS. 2B and 2C, the needle-shaped member 71 is moved toward the through hole Ha from the through hole Hp side, thereby deforming the portion 41p so as to extend from one side to the other side of the through hole Ha of one of the anode tab groups (in FIG. 2C, the second anode tab group 22g2) to protrude therefrom. More specifically, the needle-shaped member 71 is moved until a part of the portion 41p protrudes from the through hole Ha to form the protrusion 41pb. At this time, the needle-shaped member 71 is moved toward the through hole Ha from a side opposite to the through hole Ha across the anode connection part 41. The portion 41p forms a connection forming part 41pa in the through hole Ha, and a protrusion 41pb.

The connection forming part 41pa is in direct contact with the metal portions of the anode tabs 22. When no through holes Ha are pre-formed, the dielectric layers 22d and the anode connection part 41 come into contact with each other during perforation using the needle-shaped member 71, with the dielectric layers 22d on the surfaces of the anode tabs 22 being engulfed. Accordingly, the contact resistance between the anode tabs 22 and the anode connection part 41 is increased. On the other hand, by pre-forming the through hole Ha, it is possible to prevent an increase in the contact resistance between the anode tabs 22 and the anode connection part 41.

Figure 2D:
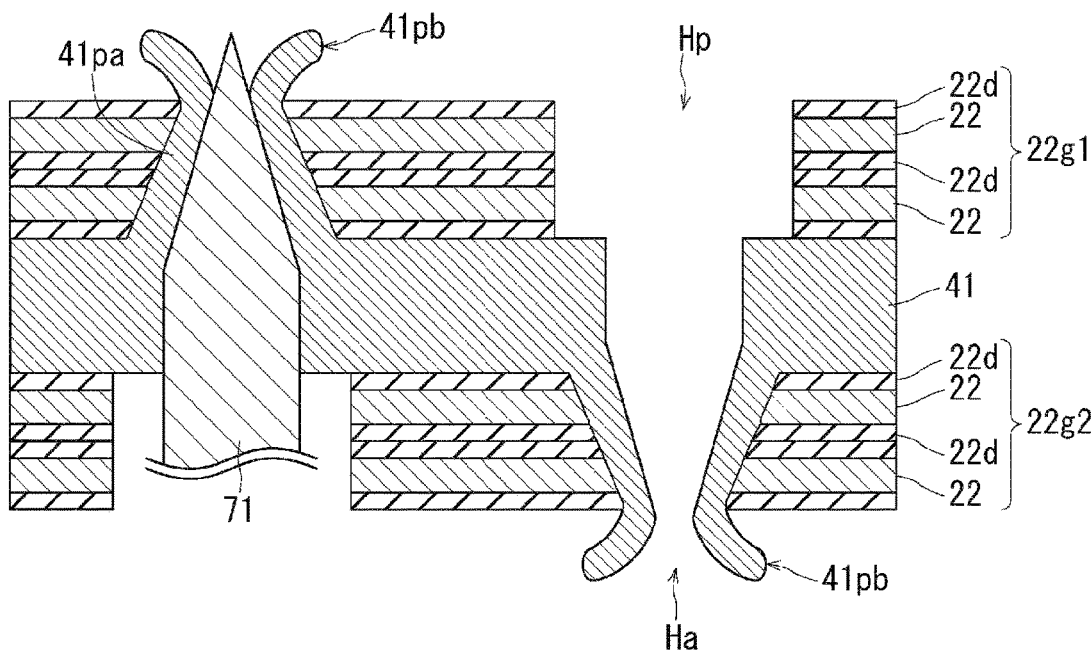
FIG. 2D is a cross-sectional view schematically showing an example of a step subsequent to FIG. 2C.

Next, as shown in FIG. 2D, a portion 41p is deformed so as to extend from one side to the other side of the through hole Ha of the other anode tab group 22g (in FIG. 2D, the first anode tab group 22g1) to form a protrusion 41pb.

Figure 2E:
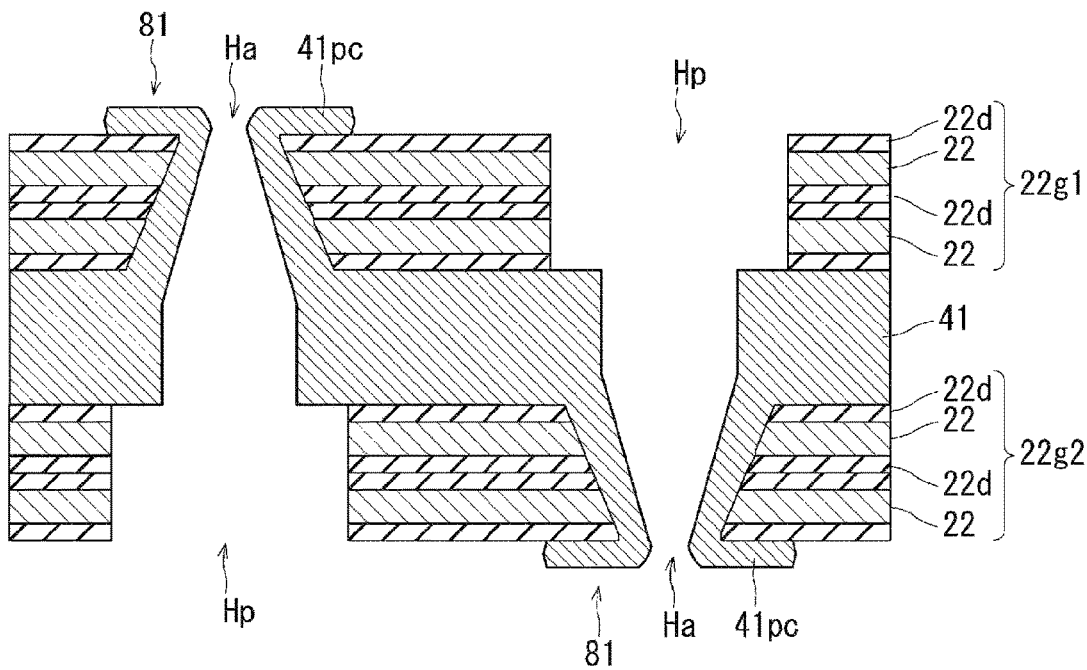
FIG. 2E is a cross-sectional view schematically showing an example of a step subsequent to FIG. 2D.

Next, as shown in FIG. 2E, the protrusions 41pb (the first protrusion and the second protrusion) are deformed so as to form crimping structures to form first fixing structures 81 (step (ii-e)). In this step, each of the protrusions 41pb is deformed such that the protrusion 41pb spreads outward to form a folded-back part 41pc. Specifically, a press-processing may be performed so as to sandwich the anode tab group 22g and the anode connection part 41 that are stacked. In this manner, the first fixing structures 81 are formed. Each of the first fixing structures 81 is formed by a portion 41p extending through the corresponding through hole Ha and forming a crimping structure.

When a plurality of first fixing structures 81 are formed in one anode tab group 22g, a plurality of portions 41p may be deformed at one time using a plurality of needle-shaped members 71 in the step (ii-c) and the step (ii-d). Similarly, a plurality of protrusions 41pb may be deformed at one time in the step (ii-e). However, when the first anode tab group 22g1 and the second anode tab group 22g2 are arranged so as to sandwich the anode connection part 41 therebetween, the perforation step using the needle-shaped members need to be performed at least twice in the step (ii-b).

Figure 3:
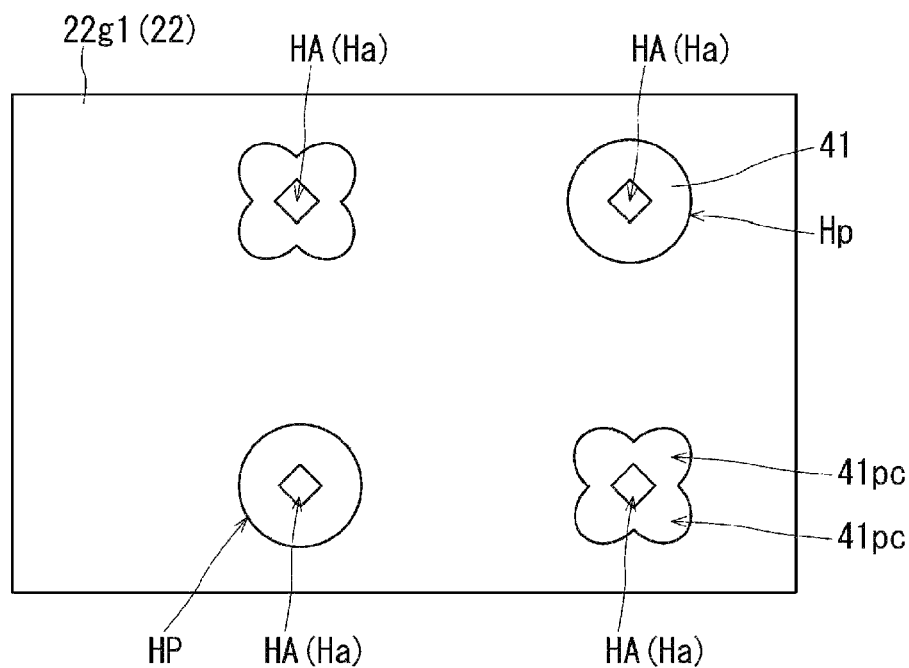
FIG. 3 is a top view schematically showing anode tabs shown in FIG. 2E.

FIG. 3 shows the state shown in FIG. 2E, as viewed from the first anode tab group 22g1 side. As shown in FIG. 3, in the case of using a needle-shaped member 71 having a tip with a quadrangular pyramidal shape, some of the portions 41p may form four petal-shaped folded-back parts 41pc. In the example described here, the pre-formed through holes Ha constitute through holes HA in the anode tab groups of an electrolytic capacitor.

With this manufacturing method, it is possible to realize a connection with a high degree of reliability and a low resistance even when the thickness of the anode tabs 22 is large, or when a large number of anode tabs 22 are connected to the anode connection part 41.

In this manner, the first fixing structures (crimping structures) are formed. Similarly, the cathode tabs and the cathode connection part are fixed to each other using second fixing structures (crimping structures).

Figure 4:
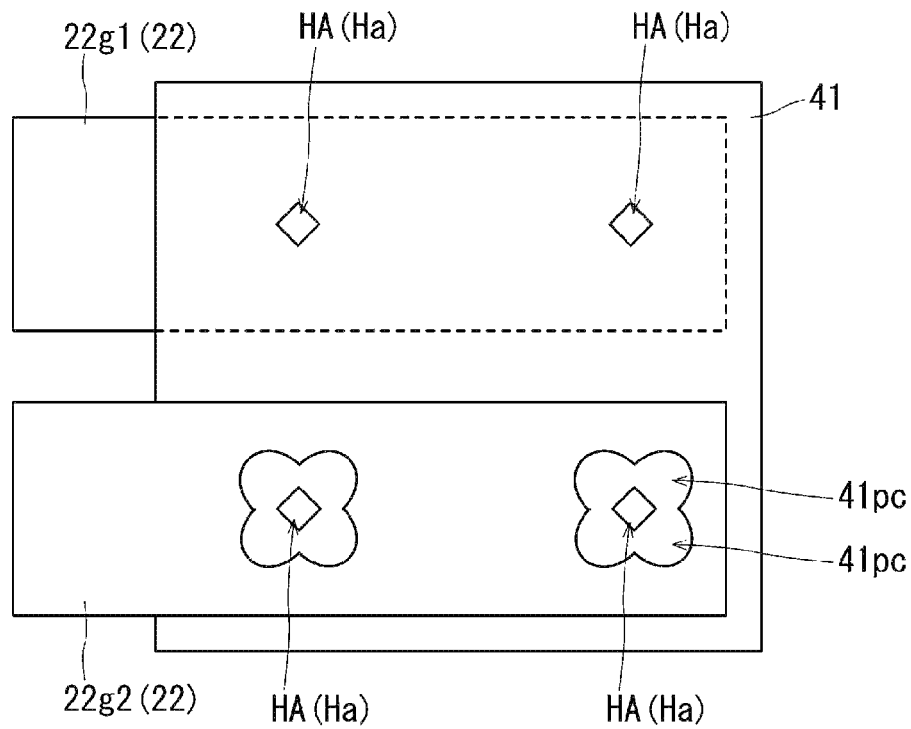
FIG. 4 is a top view schematically showing another example in the vicinity of the anode tabs.

The above-described drawings show an example in which the first anode tab group 22g1 and the second anode tab group 22g2 are stacked, and the through holes Ha and the through holes Hp are formed therein. FIG. 4 shows a top view of an example in which the first anode tab group 22g1 and the second anode tab group 22g2 are not stacked. FIG. 4 is a top view of the vicinity of the anode connection part 41 after finishing formation of the first fixing structures. In the example shown in FIG. 4, the first anode tab group 22g1 and the second anode tab group 22g2 are not stacked, and therefore no through holes Hp are formed. As describe above, the through holes Ha may or may not be pre-formed.

Figure 5:
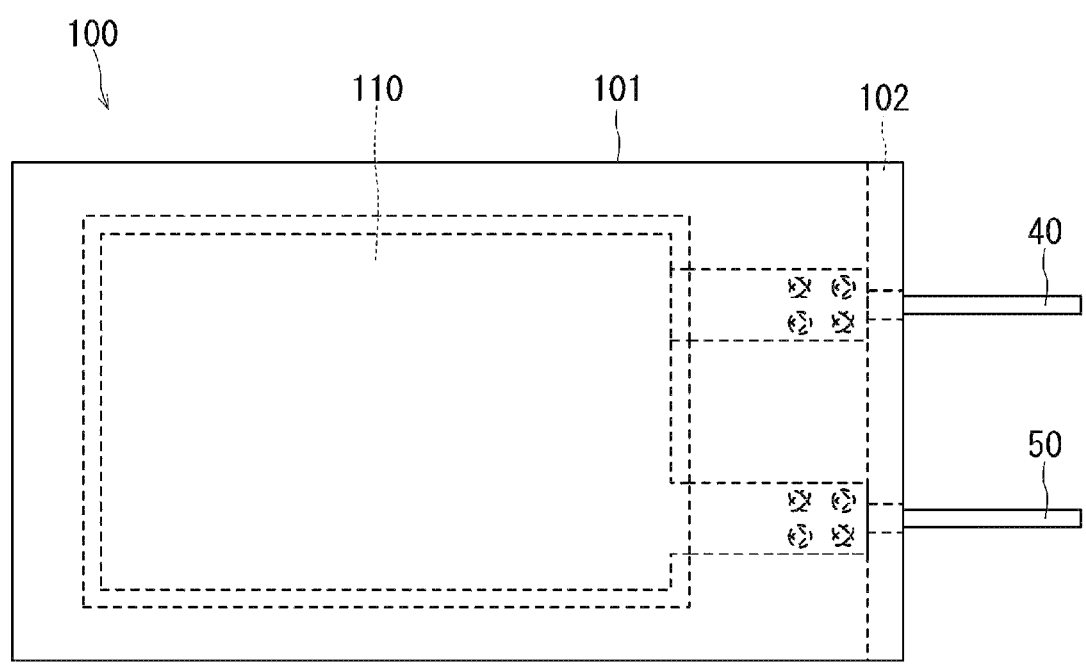
FIG. 5 is a top view schematically showing a portion of an example of an electrolytic capacitor manufactured using the manufacturing method according to Embodiment 1.

Thereafter, as described above, an electrolytic capacitor may be manufactured using the resulting stack. FIG. 5 schematically shows a cross-sectional view of an example of an electrolytic capacitor 100 that is manufactured. The electrolytic capacitor 100 includes a case 101, a stack 110 and an electrolyte (not shown) that are accommodated in the case 101, as well as a sealing body 102, an anode lead member 40, and a cathode lead member 50. The stack 110 includes a plurality of anode bodies, a plurality of cathode bodies, and a plurality of separators. An opening of the case 101 is sealed with the sealing body 102.

INDUSTRIAL APPLICABILITY

The present disclosure is applicable to an electrolytic capacitor and a manufacturing method thereof.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

21: Anode body
22: Anode tab
22d: Dielectric layer
22g: Anode tab group
22g1: First anode tab group
22g2: Second anode tab group
31: Cathode body
32: Cathode tab
32g: Cathode tab group
32g1: First cathode tab group
40: Anode lead member
41: Anode connection part
41p: Portion
41pa: Connection forming part
41pb: Protrusion
41pc: Folded-back part
50: Cathode lead member
71: Needle-shaped member (first and second needle-shaped members)
81: First fixing structure
100: Electrolytic capacitor
HA, Ha, HC, Hc, Hp, ha, hp: Through hole

The invention claimed is:

1. An electrolytic capacitor comprising:
a plurality of anode bodies and a plurality of cathode bodies that are stacked together;
a plurality of anode tabs each connected with a corresponding one of the plurality of anode bodies,
a plurality of cathode tabs each connected with a corresponding one of the plurality of cathode bodies;
an anode lead member connected to the plurality of anode tabs; and
a cathode lead member connected to the plurality of cathode tabs,
wherein the plurality of anode tabs include a first anode tab group including at least one of the anode tabs, and a second anode tab group including at least one of the anode tabs,
each of the first anode tab group and the second anode tab group has a through hole HA,
the anode lead member includes a plate-shaped anode connection part made of a metal, the anode connection part being stacked together with and connected to the first anode tab group and the second anode tab group,
each of the first anode tab group and the second anode tab group is fixed and connected to the anode connection part using at least one first fixing structure, and
the at least one of first fixing structure is formed by a portion of the anode connection part extending through the through hole HA and forming a crimping structure.

2. The electrolytic capacitor according to claim 1, wherein the first anode tab group and the second anode tab group are arranged so as to sandwich the anode connection part therebetween.

3. The electrolytic capacitor according to claim 2, wherein a through hole Hp is formed in a portion of each of the first and second anode tab groups, the portion opposing the through hole HA via the anode connection part interposed therebetween.

4. The electrolytic capacitor according to claim 1, wherein the first anode tab group includes two or more of the at least one of the anode tabs, and
the second anode tab group includes two or more of the at least one of the anode tabs.

5. The electrolytic capacitor according to claim 1, wherein the through hole HA has a diameter that decreases in a direction away from the anode connection part.

6. The electrolytic capacitor according to claim 1,
wherein each of the first anode tab group and the second anode tab group is fixed and connected to the anode connection part using two or more of the at least one first fixing structure.

7. The electrolytic capacitor according to claim 1,
wherein each of the plurality of anode tabs includes a core part, and a porous part having a dielectric layer formed on a surface thereof, and the core part and the portion of the anode connection part are in contact with each other in the through hole HA in which the at least one first fixing structure is formed.

8. The electrolytic capacitor according to claim 1,
wherein a portion of the plurality of anode tabs that overlaps the anode connection part has a smaller thickness than the anode body.

9. The electrolytic capacitor according to claim 1,
wherein the plurality of cathode tabs include a first cathode tab group including at least one of the cathode tabs, and a second cathode tab group including at least one of the cathode tabs,
each of the first cathode tab group and the second cathode tab group has a through hole HC,
the cathode lead member includes a plate-shaped cathode connection part made of a metal, the cathode connection part being stacked together with and connected to the first cathode tab group and the second cathode tab group,
each of the first cathode tab group and the second cathode tab group is fixed and connected to the cathode connection part using at least one second fixing structure, and
the at least one second fixing structure is formed by a portion of the cathode connection part extending through the through hole HC and forming a crimping structure.

10. A manufacturing method of an electrolytic capacitor including:
a plurality of anode bodies and a plurality of cathode bodies that are stacked together;
a plurality of anode tabs each connected with a corresponding one of the plurality of anode bodies,
a plurality of cathode tabs each connected with a corresponding one of the plurality of cathode bodies;
an anode lead member connected to the plurality of anode tabs; and
a cathode lead member connected to the plurality of cathode tabs,
wherein the plurality of anode tabs include a first anode tab group including at least one of the anode tabs, and a second anode tab group including at least one of the anode tabs,
the manufacturing method comprising, in the following order:
step (i) of stacking the plurality of anode bodies and the plurality of cathode bodies together; and
step (ii) of stacking each of the first anode tab group and the second anode tab group on a plate-shaped anode connection part of the anode lead member, the anode connection part being made of a metal, and fixing and connecting the first anode tab group and the second anode tab group to the anode connection part using a first fixing structure, and the step (ii) includes:
step (ii-a) of stacking the first anode tab group on the anode connection part;
step (ii-b) of stacking the second anode tab group on the anode connection part;
step (ii-c) of deforming, using a first needle-shaped member, a first portion of the anode connection part so as to penetrate the first anode tab group to form a first protrusion;
step (ii-d) of deforming, using a second needle-shaped member, a second portion of the anode connection part so as to penetrate the second anode tab group to form a second protrusion; and
step (ii-e) of deforming the first protrusion and the second protrusion so as to form a crimping structure to form the first fixing structure.

11. The manufacturing method according to claim 10,
wherein the first anode tab group includes two or more of the anode tabs, and
the second anode tab group includes two or more of the anode tabs.

12. The manufacturing method according to claim 10,
wherein the step (ii-c) and the step (ii-d) are performed after performing the step (ii-a) and the step (ii-b).

13. The manufacturing method according to claim 12,
wherein in the step (ii-a) and the step (ii-b), the first anode tab group and the second anode tab group are stacked together with the anode connection part so as to sandwich the anode connection part therebetween.

14. The manufacturing method according to claim 13, further comprising
step (X) of pre-forming a through hole Hp in a portion of the second anode tab group through which the first needle-shaped member passes in the step (ii-c), and a portion of the first anode tab group through which the second needle-shaped member passes in the step (ii-d).

15. The manufacturing method according to claim 10, further comprising
step (Y) of pre-forming a through hole Ha in a portion of the first anode tab group through which the first needle-shaped member passes in the step (ii-c), and a portion of the second anode tab group through which the second needle-shaped member passes in the step (ii-d).

16. The manufacturing method according to claim 15,
wherein in the step (Y), the through hole Ha is formed so as to have a tapered shape, and,
in the steps (ii-a) and (ii-b), the first anode tab group and the second anode tab group are stacked on the anode connection part such that the through hole Ha has a diameter that decreases in a direction away from the anode connection part.

17. The manufacturing method according to claim 10,
wherein in the step (ii), each of the first anode tab group and the second anode tab group is fixed and connected to the anode connection part using a plurality of first fixing structures.

18. The manufacturing method according to claim 10,
wherein the plurality of cathode tabs include a first cathode tab group including at least one of the cathode tabs, and a second cathode tab group including at least one of the cathode tabs,
the step (ii) further includes step (II) of stacking each of the first cathode tab group and the second cathode tab group on a plate-shaped cathode connection part of the cathode lead member, the cathode connection part being made of a metal, and fixing and connecting the first cathode tab group and the second cathode tab group to the cathode connection part using a second fixing structure, and the step (II) includes:

step (II-a) of stacking the first cathode tab group on the cathode connection part;

step (II-b) of stacking the second cathode tab group on the cathode connection part;

step (II-c) of deforming, using a third needle-shaped member, a first portion of the cathode connection part so as to penetrate the first cathode tab group to form a third protrusion;

step (II-d) of deforming, using a fourth needle-shaped member, a second portion of the cathode connection part so as to penetrate the second cathode tab group to form a fourth protrusion; and step (II-e) of deforming each of the third protrusion and the fourth protrusion so as to spread outward to form the second fixing structure.

* * * * *